United States Patent [19]

Harwell et al.

[11] Patent Number: 5,317,744
[45] Date of Patent: May 31, 1994

[54] METHOD FOR CONFIGURING A COMPUTER SERVER TO OPERATE WITH NETWORK OPERATING SYSTEM SOFTWARE TO PREVENT MEMORY ADDRESS CONFLICTS BETWEEN WORKSTATIONS

[75] Inventors: Reginald W. Harwell, Bellevue, Nebr.; Darrold J. Parker, Aurora, Colo.

[73] Assignee: The United States of America as Represented by the Secretary of the Air Force, Washington, D.C.

[21] Appl. No.: 793,068

[22] Filed: Nov. 15, 1991

[51] Int. Cl.$^5$ .................. G06F 12/00; G06F 12/02
[52] U.S. Cl. .................. 395/700; 395/425; 395/500; 364/242.91; 364/242.94; 364/DIG. 1; 364/942.51
[58] Field of Search ............ 395/700, 200, 425, 500

[56] References Cited

U.S. PATENT DOCUMENTS

| | | | |
|---|---|---|---|
| 4,731,750 | 3/1988 | Hoflich et al. | 364/900 |
| 4,759,041 | 7/1988 | Anderson et al. | 375/118 |
| 4,847,837 | 7/1989 | Morales et al. | 371/8 |
| 4,866,664 | 9/1989 | Burkhardt, Jr. et al. | 364/900 |
| 4,887,075 | 12/1989 | Hirasawa | 340/825,03 |
| 4,939,724 | 7/1990 | Ebersole | 370/85.15 |
| 4,941,089 | 7/1990 | Fischer | 364/200 |
| 4,953,162 | 8/1990 | Lyons et al. | 370/94.1 |

OTHER PUBLICATIONS

Gralla, "Guerilla networking: a network for Everyman" PC–Computing, Sep. 1990, pp. 72–79.
Rosch, "Dariana Tech. Group Inc.: System Sleuth 2.1" PC Week, Sep. 24 1990 p. 84.
Grunin "Two diagnostic utils. help ferret out hardware prob. and conflicts" PC Magazine, Apr. 10, 1990 p. 48.
Rosch, "Diag. Soft Inc.: QA Plus 4.21" PC Week Sep. 24 1990 p. 84.
Fersko-Weiss "Diagnostic programs cut support costs", Lotus, Sep. 1990 pp. 15–16.

Primary Examiner—Thomas C. Lee
Assistant Examiner—Peter Y. Wang
Attorney, Agent, or Firm—William G. Auton; Donald J. Singer

[57] ABSTRACT

A process that enables a distributed compute network to operate with a network operating system software program. The distributed computer network includes a computer server unit which has output ports and a central processing unit that controls the distributed computer network. The distributed computer network also includes a plurality of computer workstations which are electrically connected to the computer server unit. The first step of the process beings by searching the computer server unit to find an unoccupied area of memory. The second step of the process includes loading the network operating system software program onto the unoccupied area of memory of the computer server unit. The third step of the process includes reconfiguring the computer server unit output ports to eliminate memory address problems with the plurality of computer workstations.

7 Claims, 2 Drawing Sheets

METHOD FOR CONFIGURING A COMPUTER SERVER TO OPERATE WITH NETWORK OPERATING SYSTEM SOFTWARE TO PREVENT MEMORY ADDRESS CONFLICTS BETWEEN WORKSTATIONS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to distributed computer workstations, and more specifically the invention pertains to a process that was used to interface multiple "UNISYS" 800/20 workstations with a "BANYAN VINES" Network operating system. Note that the terms "UNISYS", "ETHERNET", "ZENITH", "WANG" and "BANYAN VINES" are registered trademarks, the proprietary nature of which should be respected. The generic equivalent of the "UNISYS" 800/20 workstation is a personal computer workstation as described in the U.S. Patents discussed below. Similarly, the "BANYAN VINES" network operating system can be used with a variety of commercially-available local area networks which serve as generic equivalents, as discussed below.

Although the "UNISYS" 800/20 workstation and the "BANYAN VINES" network operating system are commercially available, they do not currently work together due to conflicts that the two systems have with memory addresses, card configurations, interrupts, operating modes, etc. The task of resolving these differences is alleviated, to some extent, by the systems disclosed in the following U.S. Patents, the disclosures of which are specifically incorporated herein by reference:

U.S. Pat. No. 4,731,750 issued to Holflich, et al;
U.S. Pat. No. 4,866,664 issued to Burkhardt et al;
U.S. Pat. No. 4,758,041 issued to Anderson et al;
U.S. Pat. No. 4,847,837 issued to Morales et al;
U.S. Pat. No. 4,959,724 issued to Ebersole;
U.S. Pat. No. 4,953,162 issued to Lyons et al;
U.S. Pat. No. 4,887,075 issued to Hirasawa; and
U.S. Pat. No. 4,941,089 issued to Fischer.

All of the above-cited references describe workstations which are electrically connected by a local area network system. These references do not provide insight into the specific solutions which are necessary to pursue to enable the "UNISYS" workstation to be electrically connected with a "BANYAN VINES" system. The present invention is intended to satisfy that need.

SUMMARY OF THE INVENTION

The present invention includes a process that enables a distributed computer network to operate with a network operating system software program. The distributed computer network includes a computer server unit which has output ports and a central processing unit that controls the distributed computer network. The distributed computer network also includes a plurality of computer workstations which are electrically connected to the computer server unit.

Broadly expressed, the process has three basic steps. The first step entails searching the computer server unit to find an unoccupied area of memory. The second step includes loading the network operating system software program into the unoccupied area of memory of the computer server unit.

The final step of the process includes reconfiguring the computer server unit output ports to eliminate memory address problems with the plurality of computer workstations. This reconfiguration step has been successfully performed on the "UNISYS" server unit to enable it to operate with the "BANYAN VINES" network operating system software program and support sixty-nine "ZENITH" workstations as described below.

The "UNISYS" computer server unit has a configurable system board. The reconfiguration step includes moving jumpers on said system board to eliminate thereby said memory address problems. More specifically, the reconfiguration step comprises moving jumper JP12 from a 1-2 setting to a 2-3 setting, and reconfiguring a switchblock SW2 on the system board.

The reconfiguration step also includes adding interface cards to the system board to complete an interface between the computer workstations and the computer server unit. These interface cards include:
a WANG ICA Card;
a 3COM Etherlink Plus Card;
a EMUL:EX Tape Controller Card; and
a "UNISYS" Network Interface Card.

Each of these interface cards are installed by simply sliding them into slots on the system board which are especially provided to add additional capabilities to the "UNISYS" server unit.

When we initially attempted to install the "BANYAN VINES" Network Operating System (software) on the "UNISYS" 800/20 platform, we could not get the software to install. The system would either freeze up, or would give an internal system error. During this portion,k we had to systematically try different memory addresses and annotate any changes in the system's response. After using the process described above, the distributed computer system became completely functional.

It is an object of the present invention to provide a process that generally enables distributed computer networks to operate with a network operating system software program that is not initially compatible with it.

It is another object of the present invention to operate a series of "ZENITH" workstations controlled by a "UNISYS" server unit using the "BANYAN VINES" network operating system software program.

These objects together with other objects, features and advantages of the the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a process that can be used to enable multiple computer workstations to work with a network operating system software program. In the preferred embodiment, the process of the present invention was specifically used to make the "UNISYS" 800/20 workstation work with the "BANYAN VINES" network operating system, as discussed below. This system can also be used to enable other equivalent computer systems (such as "ZENITH" and "WANG") operate with a network operating system software program that they would not otherwise be compatible with.

Figure 1:
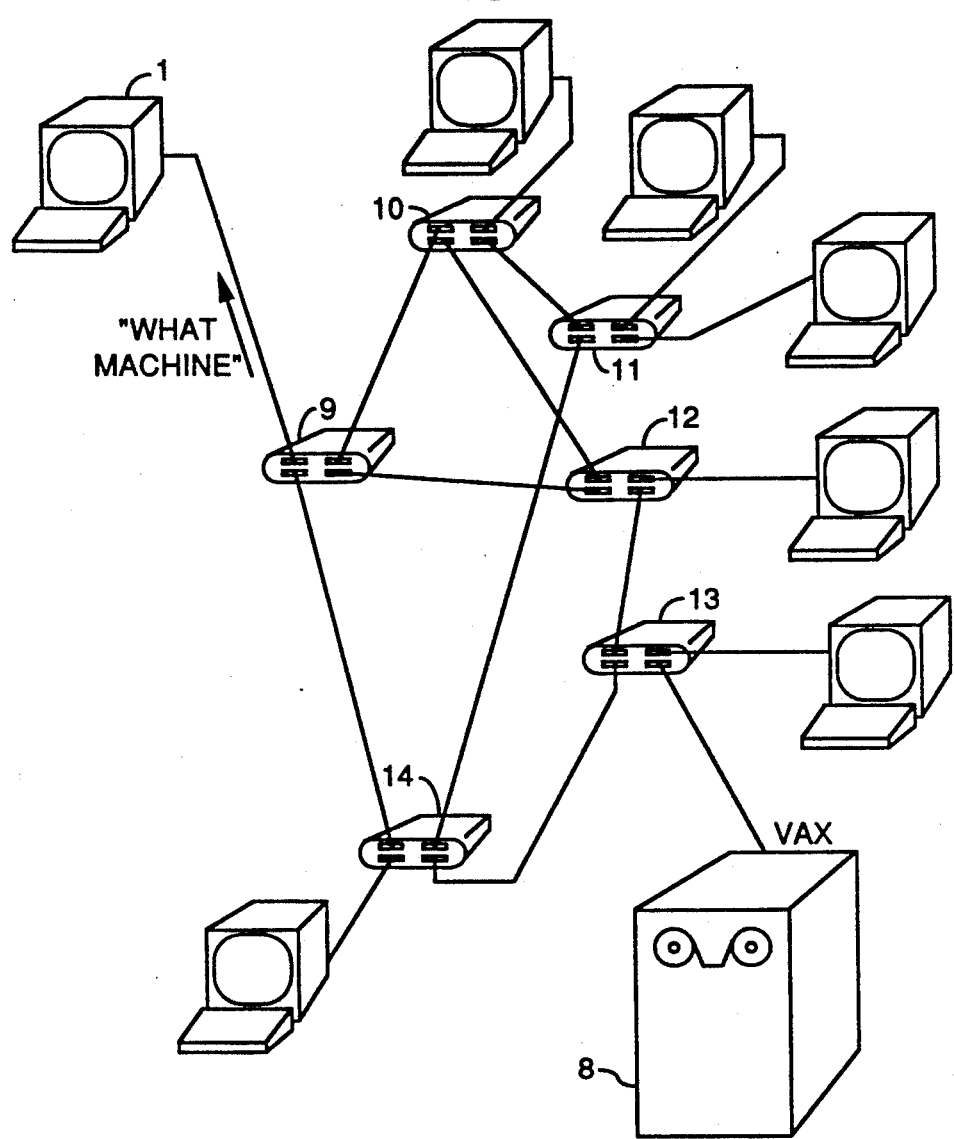
FIG. 1 is an illustration for a prior art distributed computer network.

In order to understand the context of the present invention, the reader's attention is directed towards FIG. 1. FIG. 1 represents a prior art distributed computer network taken from the above-cited Lyons et al patent. This reference shows multiple computer terminal workstations (unnumbered) which are electrically connected by a cable network and a number of nodes 8-14 to a VAX CPU 8 and controller workstation 1. For such systems to operate, the CPU 8 must be programmed with a network operating system software program the regulates the input and display of data between the CPU and multiple workstations.

When the network operating system software program is completely compatible with the make, model and physical distribution of the computer stations, things operate smoothly. More specifically, each terminal workstation is able to share the time with the CPU to input and display data in a memory address process that gives the user the impression that he is exclusively using a CPU and computer memory.

When the network operating system software program is only partially compatible with the physical system, memory address problems and interface problems can make the system appear inoperable. One such combination of seemingly software and computer systems was the configuration of FIG. 2.

Figure 2:
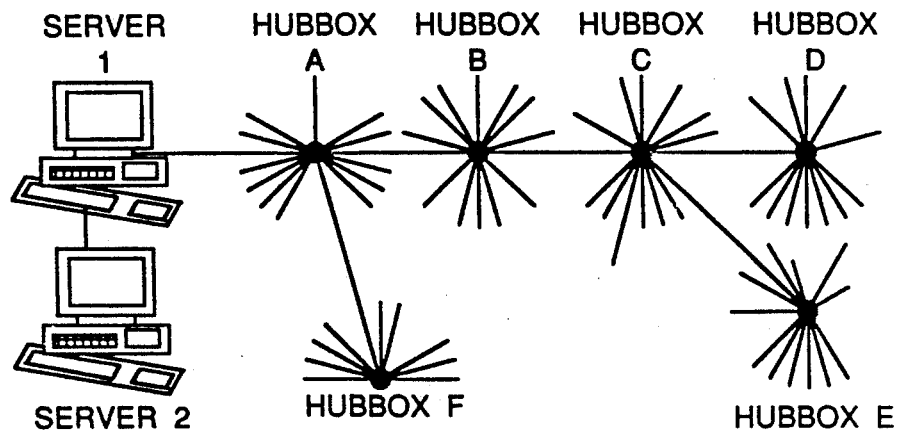
FIG. 2 is an illustration of a distributed computer network with two "UNISYS" computer server units, operating sixty-nine "ZENITH" workstations.

FIG. 2 is a sketch intended to depict a distributed computer system compost of: two "UNISYS" 800/20 controller workstations (denoted as SERVER1 and SERVER2), a cable network connecting six nodes (denoted as HUBBOX A - HUBBOX F) and lines from the nodes going out to sixty-nine "ZENITH" 248 works stations.

The network operating system software program used to control the network of FIG. 2 was the "BANYAN VINES" network operating system. As mentioned above, the process of the present invention was used to solve a number of problems and thereby reconfigure the "UNISYS" 800/20 workstation and "BANYAN VINES" network operating system so that they could work together. These problems included: conflicts of memory addresses; card configuration mismatches between the two systems; data interrupts; incompatible computer operating modes; and unconnected DMA channels.

In order to understand the memory conflicts between the two systems, consider the following example. Let's say you have a 10×10 ft. empty room. If we started in one corner and marked off 1×1" squares, we would finish with a total of 14,400 square inches. Those squares could be consecutively numbered 1 through 14,400. If you were going to put a chair in that room you would have to list the sequence numbers of the squares that are now occupied with the chair. If you try to put another chair in that same exact area of he room, you would have a conflict for space. That's the situation that we encountered with the memory on the "UNISYS" System.

Memory conflict resolution begins by searching for an area of memory that was not being used by the Disk Operating System (DOS), or any other software that was provided on the "UNISYS" Personal Computer (PC). After extensive testing, we finally settled with changing the PC from memory mode 4 (SW2-8 Off/JP12 set to 1-2) to memory mode 1 (SW2-8) On/JP12 set to 2-3). This would allow the network operating system to operate in an area of memory that wasn't being utilized by the "UNISYS" DOS system. These modifications are explained in detail in the discussion that follows.

The present invention may be regarded in the broadest sense, as a process of steps that can be used to systematically enable multiple computer workstations to work with a network operating system software program. This process was specifically used to enable the "BANYAN VINES" network operating system software program to operate the distributed computer network of FIG. 2, but the general steps of this process may also be used to enable other distributed computer networks to be run by network operating system software programs that initially appear incompatible with the hardware units.

The process begins with step 1, in which the server units of FIG. 2 were searched to find an area of memory that was not being used by the DOS software. Each of the server units of FIG. 2 happens to be a "UNISYS" 800/20 workstation that includes: a CPU, a keyboard, and a monitor. Two server units are depicted in FIG. 2 because each of these particular servers can only support up to 35 user workstations.

Once an unused area of memory is found in the server units, step 2 of the process entails loading the network operating system software program in the unused memory of the CPUs of the server units. In one example of the present invention, the "BANYAN VINES" network operating system software program is loaded into the CPUs of the "UNISYS" 800/20 server units.

The third step of the process entails reconfigurating the output ports of the system board of the server units to enable them to operate with the workstations. In order to understand this step, the reader's attention is now directed towards FIG. 3, which is an electrical schematic of the "UNISYS" system board.

Figure 3:
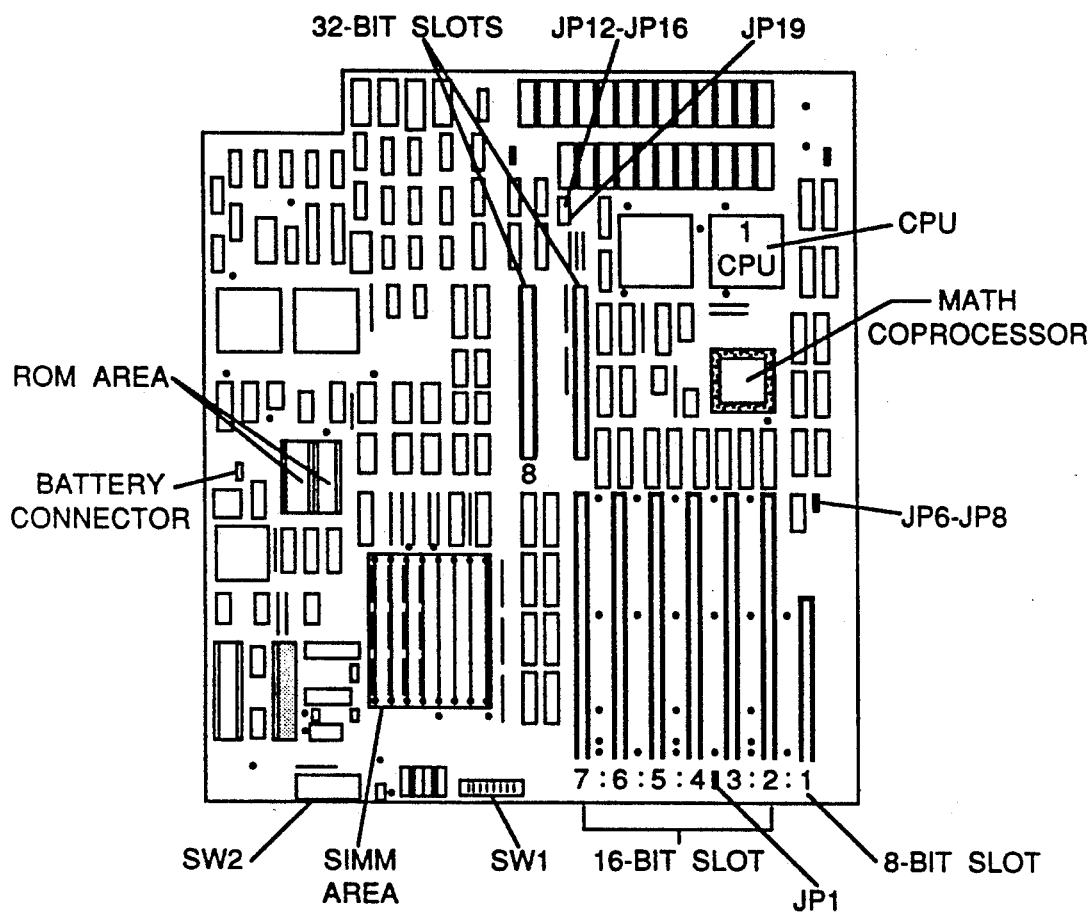
FIG. 3 is an illustration of the "UNISYS" system board.

The system board illustrated in FIG. 3 clearly shows the location of the major components of the system board listed below in Table 1.

TABLE 1

RAM (SIMM area)
I/O connector slots (board connectors)
CPU
Math coprocessor socket
ROM chips
Switchblocks SW1 and SW2
Jumpers JP1, jP6-JP8, JP12-JP16, and JP19
Battery connector The reconfiguration step of the process is actually divided into two substeps. Note that each of these substeps were determined empirically by trial and error. In the first substep, jumper JP12 is moved from its setting of 1-2 to a setting of 2-3. In order to understand the process of changing jumpers, the reader's attention is now directed towards FIGS. 4 and 5.

Figure 4:
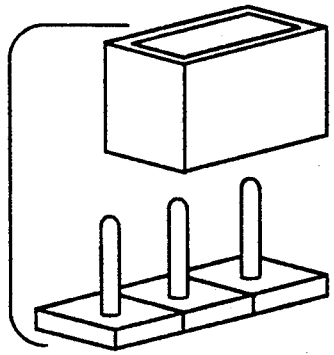
FIGS. 4 and 5 are illustrations depicting the moving of an electrical jumper connector to a new location on the pins of a system board.
Figure 5:
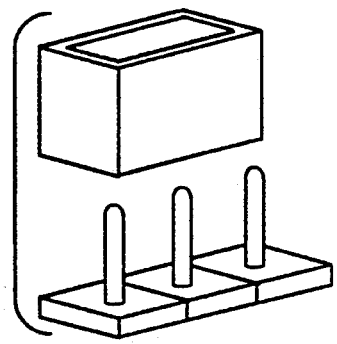

FIGS. 4 and 5 are illustrations of a jumper being moved on the system board pins of the "UNISYS" 800/20 system board as shown. The jumper boot is moved by gently pulling upwards on the it and lowering it over the two pins you wish to cover. A pair of needle-nose pliers can be used to remove the jumper boot, or in some cases, it can be removed by hand.

Figure 6:
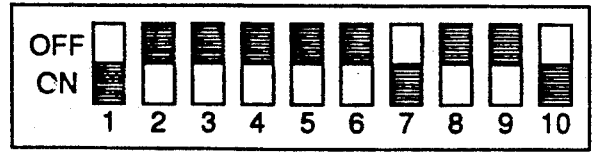
FIG. 6 is an illustration of the switchblock SW2 of the "UNISYS" system board.

The second substep of process step number 3 entails reconfiguring the switch block SW2 on the "UNISYS" 800/20 system board. This substep is best understood by looking at the details of the switchblock SW2 settings shown in FIG. 6. FIG. 6 illustrates the default settings of switchblock SW2. When the network operating system software program operates properly, this substep can be omitted. To operate with the "BANYAN VINES" network operating system software program, toggle switch #3 had to be placed in the down (on) position to disable the COM 2 port and allow INT 3 to be used as a tape backup.

Switchblock SW2 of the "UNISYS" 800/20 system board can be reconfigured in 4 steps. Step 1 is locate the switchblock SW2 on the system board and remove the SW2 switch cover. A phillips screwdriver can be used to remove the access plate located on the rear panel of the system board of FIG. 3. Step 3 entails placing toggle switch #3 in the down (on) position. In step 4, the access cover is replaced.

The final step of the process of the present invention entails the addition of interface hardware to the server units, if necessary, to complete the compatibility between the "UNISYS" units, the workstation units, and the network operating system software program. In the present invention, four commercially available cards were added to each "UNISYS" server unit. These cards are listed below in Table 2.

TABLE 2

WANG ICA Card
3COM Etherlink Plus Card
EMULEX Tape Controller Card
UNISYS Network Interface Card (NIC) (Purchased from UNISYS)

Note that each of these cards are added to the "UNISYS" server units by simply pushing them into slots available on the "UNISYS" system board. In fact, all computer systems generally have slots available for adding additional capabilities such as a mouse or a modem.

There are four basic configurable settings on each card we used. Those are:

a. INTERRUPT CHANNEL (IRQA)—A line (bus) between the card and the processor (CPU). This channel allows the card to interrupt system processing to request the use of system resources, such as ARithmetic Logic Unit (ALU) or Memory. Two devices should not use the same Interrupt channel due to the fact that simultaneous usage attempts could lock the system due to a conflict.

b. DIRECT MEMORY ACCESS (DMA)—A direct line/channel between the card and the system's memory module. This allows a card to directly access any information, located in memory, without interrupting the processor. Two devices should not use the same DMA channel due to the fact that simultaneous usage attempts could lock the system due to a conflict.

c. INPUT/OUTPUT ADDRESS (I/O ADDRESS)—This is a number which identifies an area in memory that i to be used for the temporary storage of information that has been loaded into the system and is waiting to be processed (Input), or information that has already been processed and is waiting to be sent to its final destination (output). This setting should also be unique on each component.

d. RANDOM ACCESS MEMORY (RAM) ADDRESS—This is a number which identifies an area in memory that is to be used by the card for the purpose of performing it's function. This setting should be unique on each component.

e. There is also a AUI/BNC setting which is used on some cards. This setting selects either the card's AUI connector or BNC connector to be used during processing.

The first card that was configured was the "UNISYS" NIC card. We changed the W3 jumper from the BNC position to the AUI position. This allowed us to use the AUI connector on the rear of the card. Next we inserted the "UNISYS" Network Interface Card into the PC. We didn't have a problem with the card settings at this point. The original and final card settings are:

|  | ORIGINAL | FINAL |
|---|---|---|
| DMA | — | — |
| INTERRUPT | 3 | 2 |
| I/O ADDRESS | 240 | 280 |
| RAM ADDRESS | CA0000 | D0000 |
| AUI/BNC | BNC | AUI |

Next, we inserted the 3COM card into the system and found that it's settings conflicted with some component in the PC. We took several days of rebooting the system and trying different card setting (DMA, INT, I/O and RAM ADDRESSES) before we found one that was suitable.

|  | ORIGINAL | FINAL |
|---|---|---|
| DMA | 1 | 6 |
| INTERRUPT | 3 | 12 |
| I/O ADDRESS | — | — |
| AUI/BNC | BNC | BNC |

Our next step was to insert the ICA card into the system. Once again, we tried to initialize the network and received several errors and system freezes. Now we had to find card settings that would not interfere with the NIC card, 3Com Card, or the "UNISYS" system board.

|  | ORIGINAL | FINAL |
|---|---|---|
| DMA | — | — |
| INTERRUPT | 3 | 14 |
| I/O ADDRESS | 100 | 120 |
| RAM ADDRESS | 8000 | FA0000 |
| AUI/BNC | — | — |

Finally the above process was repeated when inserting the Emulex card.

|  | ORIGINAL | FINAL |
|---|---|---|
| DMA | 1 | 1 |
| INTERRUPT | 3 | 3 |
| I/O ADDRESS | — | — |
| RAM ADDRESS | ca000 | ca000 |
| AUI/BNC | — | — |

The process recited above was used as a process of reconfiguring the "UNISYS" 800/20 workstation and the "BANYAN VINES" Network operating System so that they can work together. This process in its general steps can also be used to enable other distributed computer systems to operate with a network operating system software program that they would not otherwise be compatible with.

When we initially attempted to install the "BANYAN VINES" Network operating System (software) on the "UNISYS" 800/20 platform, e could not get the software to install. The system would either freeze up, or would give an internal system error. During this portion, we had to systematically try different memory addresses and annotate any changes in the system's response. After using the process described above, the distributed computer system became completely functional.

While the invention has been described in its presently preferred embodiment it is understood that the words which have been used are words of description rather than words of limitation mitation and that changes within the purview of the appended claims may be made without departing from the scope and spirit of the invention in its broader aspects.

What is claimed is:

1. A process that enables a distributed computer network to operate with a network operating system software program, wherein said distributed computer network includes a computer server unit which has output ports and a central processing unit that controls the distributed computer network, said distributed computer network also including a plurality of computer workstations which are electrically connected to the computer server unit, and wherein said process comprises the steps of:
    searching the computer server unit to find an unoccupied area of memory;
    loading the network operating system software program into the unoccupied area of memory of the computer server unit; and
    reconfiguring the computer server unit output ports to eliminate memory address problems with the plurality of computer workstations, wherein said computer server unit has a configurable system board, and wherein said reconfiguration step comprises moving jumpers on said system board to eliminate said memory address problems, and wherein said computer server unit comprises a "UNISYS" 800/20 server unit and wherein said reconfiguration step comprises moving jumper JP12 from a 1-2 setting to a 2-3 setting, and reconfiguring a switchblock SW2 on said system board.

2. A process, as defined in claim 1, wherein said network operating system software program is a "BANYAN VINES" network operating system software program.

3. A process, as defined in claim 2, wherein said reconfiguration step includes adding interface cards to the system board to complete an interface between the computer workstations and the computer server unit.

4. A process, as defined in claim 3, wherein said interface cards comprise:
    a WANG ICA Card;
    a 3COM Etherlink Plus Card;
    a EMULEX Tape Controller Card; and
    a "UNISYS" Network Interface Card.

5. A process that enables a distributed computer network to operate with a "BANYAN VINES" network operating system software program, wherein said distributed computer network includes a computer server unit which has output ports and a central processing unit that controls the distributed computer network, said distributed computer network also including a plurality of ZENITH computer workstations which are electrically connected to a "UNISYS" computer server unit, and wherein said process comprises the step of:
    searching the "UNISYS" computer server unit to find an unoccupied area of memory;
    loading the "BANYAN VINES" network operating system software program into the unoccupied area of memory of the computer server unit; and
    moving jumpers on a system board of said "UNISYS" server unit to eliminate said memory address problems; and
    adding interface cards to said system board of said "UNISYS" server unit to complete an interface between said "UNISYS" server unit and said "ZENITH" workstation wherein said moving step comprises moving jumper JP12 from a 1-2 setting on said system board to a 2-3 setting.

6. A process, as defined in claim 5, wherein said interface cards comprise:
    a WANG ICA Card;
    a 3COM Etherlink Plus Card;
    a EMULEX Tape Controller Card; and
    a "UNISYS" Network Interface Card.

7. A process, as defined in claim 6 which includes a reconfiguration step in which said system board has an SW2 switchblock which has toggle switches which are reconfigured to complete an interface between said "UNISYS" server unit and said "ZENITH" workstations.

* * * * *

UNITED STATES PATENT AND TRADEMARK OFFICE
CERTIFICATE OF CORRECTION

PATENT NO. : 5,317,744
DATED : May 31, 1994
INVENTOR(S) : Reginald W. Harwell, et. al.

It is certified that error appears in the above-indentified patent and that said Letters Patent is hereby corrected as shown below:

Title page, item [75], inventors: add Barbara A. Buchanan, La Vista, NE--.

Signed and Sealed this

Eleventh Day of July, 1995

*Attest:*

BRUCE LEHMAN

*Attesting Officer*     *Commissioner of Patents and Trademarks*